O. F. PERSSON.
COUPLING.
APPLICATION FILED SEPT. 4, 1917.

1,298,556.

Patented Mar. 25, 1919.

Inventor:
Otto F. Persson,
by Albert G. Davis
His Attorney.

UNITED STATES PATENT OFFICE.

OTTO F. PERSSON, OF ERIE, PENNSYLVANIA, ASSIGNOR TO GENERAL ELECTRIC COMPANY, A CORPORATION OF NEW YORK.

COUPLING.

1,298,556.     Specification of Letters Patent.     Patented Mar. 25, 1919.

Application filed September 4, 1917. Serial No. 189,512.

*To all whom it may concern:*

Be it known that I, OTTO F. PERSSON, a citizen of the United States, residing at Erie, in the county of Erie, State of Pennsylvania, have invented certain new and useful Improvements in Couplings, of which the following is a specification.

The present invention relates to couplings, such as are used for coupling a driving member to a driven member, and has for its object to provide an improved coupling which is flexible so that it will take care of inaccuracies in bearing alinements, and which can be adjusted circumferentially with great accuracy to bring the driving and driven members to exact relation to each other.

For a consideration of what I believe to be novel and my invention, attention is directed to the accompanying specification and the claims appended thereto.

Figure 1:
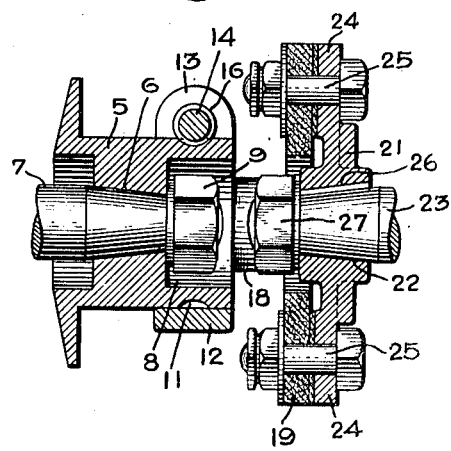
Figure 2:
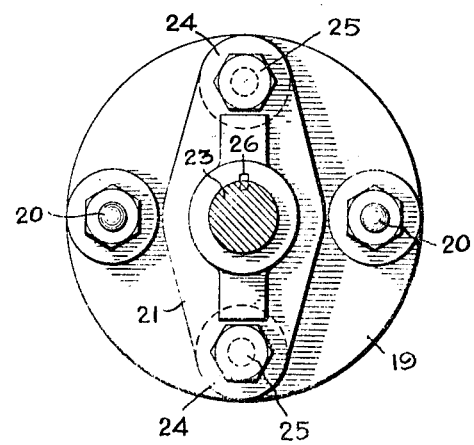
Figure 3:
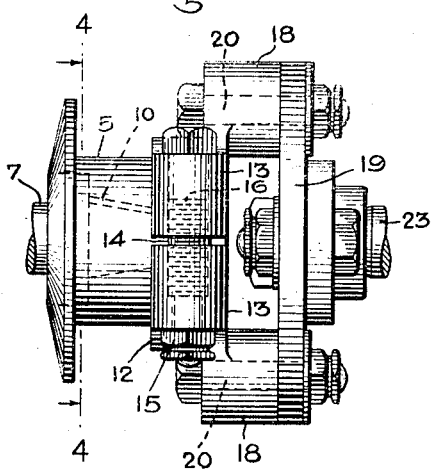
Figure 4:
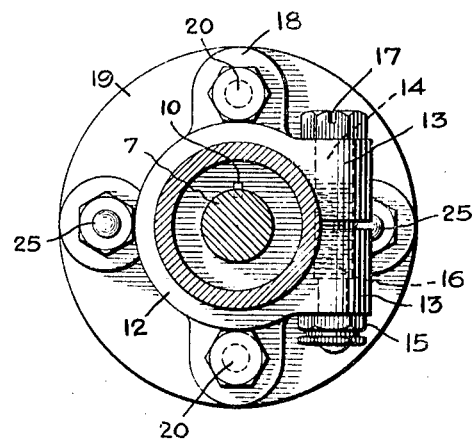

In the drawing, Figure 1 is a longitudinal sectional view through a coupling embodying my invention; Fig. 2 is an end view thereof; Fig. 3 is a top plan view of the coupling as shown in Fig. 1, and Fig. 4 is a section taken in line 4—4, Fig. 3.

Referring to the drawing, 5 indicates a sleeve having a tapered bore 6 adapted to receive the end of a shaft 7 and a countersunk recess 8 which may house a nut 9 threaded on the end of a shaft 7 to hold the sleeve in position thereon. 10 indicates a key-way by means of which the sleeve may also be keyed to a shaft end. The shaft, it will be understood, may be either a driving or a driven shaft, and the sleeve 5 may be connected to it in any suitable manner. On the surface of sleeve 5 is cut a ring of teeth 11, forming in substance a rack, and surrounding the sleeve at this point, is a split collar 12 having lugs 13 at its ends through which extends a bolt 14. The bolt passes freely through lugs 13 and is threaded on its end to receive a nut 15. By turning up nut 15 the lugs are drawn together and the split collar is tightly clamped to the sleeve 5. At an intermediate point bolt 14 is provided with a worm thread 16 which meshes with the teeth 11. By this arrangement, the collar 12 and sleeve 5 can be adjusted circumferentially relatively to each other by turning the bolt 14. For this purpose the head of the bolt is provided with a slot 17 to receive a screw driver.

The split collar 12 is provided with two projecting lugs 18 located diametrically opposite to each other, and to them is fastened a flexible washer 19 by means of the bolts 20. The washer 19 may be formed of leather, for example, or other suitable material. Connected to the washer 19 on a diameter at right angles to the diameter on which lugs 18 are located, is a cross-bar comprising a central portion 21 having a flanged tapered opening 22 at its center adapted to receive the end of a shaft 23, and two projecting arms 24, the ends of which are fastened to the washer 19 by bolts 25. The opening 22 has a key-way 26 to receive a key for fastening the bar to shaft end 23, and it may further be held in place by providing the shaft end with a threaded portion which projects entirely through the opening 22 and is adapted to receive a retaining nut 27.

The manner of applying the coupling to a pair of adjacent shaft ends is obvious. When so applied the sleeve 5 forms an integral part of the shaft to which it is attached and, as will be clear, instead of cutting the teeth 11 on a sleeve which in turn is fastened to the shaft, the teeth could be cut directly on the shaft itself, if found desirable.

One application of my invention is in connection with internal combustion engines for connecting the sparking mechanism, which may comprise, for example, a magneto and timer, to the countershaft which drives it, such countershaft being driven from the crank shaft in the usual manner through a gearing. If the magneto and timer are rigidly connected to the countershaft which drives them, then the gearing between such countershaft and the driving shaft must be very accurately located and adjusted to give the correct angular relation for correct timing, and this is very difficult and often requires much skill and time. By the use of my improved coupling this difficulty is overcome. When applied to this use, the shaft 7 may be the driving shaft and the shaft 23 the driven shaft. The driving shaft 7 will be set up as to its driving gearing as nearly as convenient in the correct angular position to give correct timing. The nut 15 is then loosened and the bolt 14 turned to bring the driving shaft 7 and driven shaft 23 into correct angular relation. The nut 15 is then tightened to squeeze the split collar 12 together about the sleeve 5, and hold the parts in adjusted position. By the use of the flexible coupling comprising the washer 19, a slight amount of axial play is permitted, and any slight inaccuracies in the bearing alinements will be taken care of in the well understood manner.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with adjacent shaft ends, of a coupling connecting them which comprises members fastened to the adjacent shaft ends and bolted to each other, the connection between one of said members and the shaft end to which it is connected, comprising a split collar, and means comprising a worm for adjusting the collar circumferentially of the shaft end and for clamping the collar to the shaft end.

2. The combination with adjacent shaft ends, of a coupling member fixed to one shaft end, a split collar surrounding the other shaft end and connected to it by a screw connection whereby the collar may be adjusted circumferentially thereon, a nut for clamping the split collar to the shaft end, and means connecting the coupling member and collar together.

3. The combination with adjacent shaft ends, of a coupling therefor comprising a split collar which surrounds one of said ends, means forming a screw connection between said collar and such end, a nut for clamping the split collar to the shaft end, and means connecting the collar to the other member whereby when said nut is loosened and said screw connection is operated said shaft ends will be adjusted circumferentially relatively to each other.

4. The combination with two adjacent members one of which is adapted to rotate the other, of a coupling therefor comprising a split collar which surrounds one of said members, a bolt adapted to clamp the collar to such member, a screw connection between said bolt and said last named member, and means connecting said collar to the other member, whereby when the bolt is turned the two adjacent members will be adjusted circumferentially relatively to each other.

5. In a coupling, the combination of a sleeve having teeth cut on its surface, a split collar surroundinig the sleeve and provided with adjacent lugs having openings therein, a bolt extending through said openings and having a threaded end, a nut which screws thereon to clamp the collar to the sleeve, and a screw thread on said bolt which engages said teeth whereby the sleeve and collar may be adjusted circumferentially relatively to each other by turning said bolt.

6. In a flexible adjustable coupling, the combination of a member having teeth cut on its surface, a split collar surrounding said member, a bolt which connects the ends of said collar and has a threaded portion engaging said teeth, a flexible element, means connecting the flexible element to said split collar, and a second member connected to said element and adapted to be connected to a shaft end.

In witness whereof, I have hereunto set my hand this 30th day of August, 1917.

OTTO F. PERSSON.